United States Patent
Masahashi et al.

(10) Patent No.: US 8,445,401 B2
(45) Date of Patent: May 21, 2013

(54) RUTILE-TYPE TITANIUM DIOXIDE PHOTOCATALYST

(75) Inventors: Naoya Masahashi, Sendai (JP); Yoshiteru Mizukoshi, Sendai (JP); Naofumi Ootsu, Sendai (JP); Yu Matsuda, Sendai (JP); Satoshi Senboshi, Sakai (JP)

(73) Assignees: Tohoku University (JP); Osaka Prefecture University (JP)

( * ) Notice: Subject to any disclaimer, the term of this patent is extended or adjusted under 35 U.S.C. 154(b) by 126 days.

(21) Appl. No.: 13/001,588

(22) PCT Filed: May 26, 2009

(86) PCT No.: PCT/JP2009/059559
§ 371 (c)(1),
(2), (4) Date: Mar. 14, 2011

(87) PCT Pub. No.: WO2009/157266
PCT Pub. Date: Dec. 30, 2009

(65) Prior Publication Data
US 2011/0160047 A1    Jun. 30, 2011

(30) Foreign Application Priority Data

Jun. 27, 2008 (JP) .................. 2008-168142
Dec. 24, 2008 (JP) .................. 2008-327669

(51) Int. Cl.
*B01J 27/02* (2006.01)
*B01J 23/00* (2006.01)

(52) U.S. Cl.
USPC .......................... 502/216; 502/350

(58) Field of Classification Search
None
See application file for complete search history.

(56) References Cited

U.S. PATENT DOCUMENTS

| 7,175,911 B2 * | 2/2007 | Zhou et al. ............ 428/403 |
| 2004/0024108 A1 | 2/2004 | Sugihara ................ 524/497 |

FOREIGN PATENT DOCUMENTS

| JP | 2002-113369 | 4/2002 |
| JP | 2002-355562 | 12/2002 |
| JP | 2003-129290 | 5/2003 |
| JP | 2006-89343 | 4/2006 |

OTHER PUBLICATIONS

Velten et al, preperation of tio2 layers on cp-ti and ti6al4v by thermal and anoidc oxidation and by sol gel coating techiques and their characterization, 2001 john wiley and sons.*

Notification of Transmittal of Translation of the International Preliminary Examination Report on Patentability, dated Mar. 24, 2011 issued in PCT/JP2009/059559 (12 pgs).

(Continued)

*Primary Examiner* — Melvin C Mayes
*Assistant Examiner* — Stefanie Cohen
(74) *Attorney, Agent, or Firm* — Hayes Soloway P.C.

(57) ABSTRACT

It has been demanded to produce titanium dioxide having an excellent photocatalytic activity and an excellent super-hydrophilic property by a simple procedure suitable for the production on an industrial scale. Rutile-type titanium dioxide having an excellent photocatalytic activity can be produced by carrying out the anodic oxidization of the surface of a base material comprising titanium or a titanium alloy by applying a voltage (e.g., a high voltage) or carrying out the anodic oxidation of the surface of the base material under high current density conditions. Further, a film is produced on the surface of the base material by the anodic oxidation technique by applying a voltage or the anodic oxidization technique under high current density conditions, and the film is subjected to heat treatment, thereby producing rutile-type titanium dioxide having excellent crystallinity.

15 Claims, 5 Drawing Sheets

OTHER PUBLICATIONS

Japanese International Search Report + Translation, PCT/JP2009/059559 (8 pgs).

Ahn Sojeung et al., "Characterization of Anodized Titanium Oxide Film and Photocatalytic Decomposition of Methylene Blue with Microcurrent", J.Adv. Oxid. Technol., 2007, vol. 10, No. 2, p. 354-360.

Ragalevicius, Rimas et al., Micro-Arc oxidation of Ti in a solution of sulfuric acide and $Ti^{+3}$ salt, Appl. Surf. Sci., Jan. 2008, vol. 254, No. 6, p. 1608-1613.

Meyer, Susann et al., Preparation and characterization of titanium dioxide films for catalytic applications generated by anodic spark deposition, Thin Solid Films, 2004, vol. 450, No. 2, p. 276-281.

Yang, Yang et al., Crystallization and Phase Transition of Titanium Oxide Nanotube Arrays, J. Am. Ceram. Soc., Feb. 2008, vol. 91, No. 2, p. 632-635.

Yoshiteru Mizukoshi et al., "Konodo Ryusan Suiyoeki-chu deno Yokyoku Sanka ni yoru Rutile-so o Shutai to shita Nisanka Titanium Hikari Shokubai no Chosei", Dai 102 Kai CatSJ Meeting Toronkai A Yokoshu, Sep. 2008, p. 1.

Naoya Masahashi et al., "Yokyoku Sankaho ni yori Sakusei shita Rutile-gata Nisanka Titanium Hikari Shokubai no Seino", Abstracts of the Japan Institute of Metals, Sep. 2008, p. 261.

* cited by examiner

RUTILE-TYPE TITANIUM DIOXIDE PHOTOCATALYST

TECHNICAL FIELD

The present invention relates to a technique for forming rutile-structured titanium dioxide having photocatalytic activity on the surface of a base material of titanium or a titanium alloy.

BACKGROUND ART

Metal oxides having semiconductor characteristics, and titanium oxide in particular, are endowed with excellent photocatalytic activity by being irradiated under ultraviolet illumination, and chemical substances in the gas or liquid phase (also the solid phase in certain cases) is decomposed oxidatively on the surface thereof. The titanium oxide having strong oxidizing power decomposes chemical substances by the photocatalytic reaction and exhibits deodorizing, antifungal, and bactericidal characteristics.

Vapor deposition and sol-gel techniques are widely used as conventional techniques for supporting titanium dioxide on the surface of titanium or a titanium alloy. The sol-gel technique is a simple method performed by dip coating and spin coating, and has the ability to provide support on arbitrary morphologies of base materials, but is problematic in being an inferior method for mass-production. Particular weaknesses are that film uniformity is poor and support can be provided only on plate base materials with spin coating. On the other hand, vapor deposition provides excellent density and uniformity in titanium oxide, but is disadvantageous in that the cost is high due to the use of special devices, and the possibility of spalling is high due to considerable film thickness.

A method in which a titanium dioxide thin film having photocatalytic activity is formed by anodic oxidation has been proposed as an alternative to the previous techniques. In the reported examples of the manufacture of photocatalytic titanium dioxide thin films using anodic oxidation, it is assumed that, as a photocatalyst, anatase-structured titanium dioxide has higher activity than does the rutile-structured titanium dioxide known as a high-temperature crystal, and the object is to form an entirely anatase-structured titanium dioxide film.

Patent Document 1 discloses as such a conventional technique a photocatalyst and a photocatalyst manufacturing method characterized in that the crystal structure includes rutile-structured titanium dioxide, but this is a technique for fabricating a photocatalyst composed of titanium oxide powder. The rutile-structured titanium dioxide powder in these techniques is obtained by annealing the anatase-structured titanium dioxide powder in hydrogen atmosphere, resultantly it is composed of a mixture with anatase-structured titanium dioxide in which oxygen defects are introduced; is obtained as rutile-structured titanium dioxide powder; or is obtained by introducing oxygen defects or substituting the third element in titanium oxide.

Among these, there are no documents reporting the superhydrophilicity of titanium dioxide thin film by anodic oxidation, and the formation of a rutile-structured titanium dioxide thin film having photocatalytic activity by anodic oxidation is not reported.

PRIOR ART DOCUMENTS

Patent Document

Patent Document 1: Japanese Patent Publication No. 2002-113369

DISCLOSURE OF THE INVENTION

Problems to Be Solved by the Invention

An object of the present invention is to provide a technique for obtaining titanium dioxide suitable for commercial production and provided with excellent photocatalytic activity and superhydrophilicity as a uniform and dense substance using simple means. In particular, the object is to develop a technique for forming a titanium dioxide thin film having excellent photocatalytic activity and superhydrophilicity function.

Means for Solving the Problems

The present inventors performed painstaking research aimed at solving the aforementioned problems and unexpectedly discovered that the photocatalytic activity, superhydrophilicity properties, and other properties of titanium dioxide photocatalysts are extremely good in rutile-structured titanium dioxide thin films.

Oxygen vacancies are readily incorporated by ultraviolet light irradiation, and adsorption of hydroxyl groups on the oxygen vacancies is accelerated to improve superhydrophilicity in a titanium dioxide thin-film designed to improve the crystallinity of the rutile structure obtained in the present invention.

Contrary to conventional knowledge, photocatalysts exist in the rutile phase and have excellent photocatalytic properties. Therefore, problems such as those related to the formation of a stable rutile phase at high temperatures are no longer relevant in cases in which annealing conditions are unsuitable, and annealing to improve crystallinity in equilibrium can be performed effectively. In addition, the anodic oxidation film formed in the present invention already exhibits excellent activity prior to the annealing.

Exceptional photocatalytic activity, superhydrophilicity, and other properties can be obtained with a rutile-structured titanium dioxide thin film as described above. Therefore, a film capable of simultaneously fulfilling the two functions of superhydrophilicity and oxidative degradation characteristics can therefore be manufactured by performing a designated annealing on the anodic oxidation film. The present invention was accomplished based on such findings.

The present invention provides a method for manufacturing rutile-structured titanium dioxide provided with excellent crystallinity and photocatalytic activity by applying a voltage (preferably a high voltage) during anodic oxidation on the surface of titanium or a titanium alloy. The present invention provides a method for manufacturing rutile-structured titanium dioxide provided with excellent crystallinity and photocatalytic activity by anodic oxidation under conditions of high current density on the surface of a titanium or a titanium alloy. The present invention also provides a method for manufacturing rutile-structured titanium dioxide having excellent crystallinity by performing annealing on a film produced by applying a high voltage or under conditions of high current density during anodic oxidation on the surface of a titanium or a titanium alloy.

The present invention provides the following.

(1) A method for manufacturing rutile-structured titanium dioxide having excellent photocatalytic activity by (i) applying a voltage (for example, a high voltage) during anodic oxidation on a surface of a titanium or a titanium alloy, or (ii) performing anodic oxidation on the surface of the base material under conditions of high current density.

(2) The method according to (1), characterized in that the anodic oxidation is performed in an electrolyte of sulfuric acid concentration ranging from 2.6 to 14.1 wt %.

(3) The method according to (1) or (2), characterized in that the conditions of current density are 25 mA/cm$^2$ or higher.

(4) The method according to any of (1) to (3), characterized in that the anodic oxidation is performed for a duration of 2 minutes or longer.

(5) The method according to (1) or (2), characterized in that the voltage is 100 V or higher.

(6) The method according to (1), (2), or (5), characterized in that the anodic oxidation is performed for a duration of 2.2 hours or longer.

(7) A method for manufacturing rutile-structured titanium dioxide having excellent photocatalytic activity by performing annealing on a film produced by (i) applying a voltage (for example, a high voltage) during anodic oxidation on a surface of a titanium or a titanium alloy, or (ii) performing anodic oxidation on the surface of the base material under conditions of high current density.

(8) The method according to (7), characterized in that the annealing is performed at a temperature ranging from 400 to 1000° C.

(9) The method according to (7) or (8), characterized in that the annealing is performed for a duration of 1 hour or longer.

(10) A method for manufacturing rutile-structured titanium dioxide with high crystallinity, comprising (i) applying a voltage (for example, a high voltage) during anodic oxidation on a surface of a titanium or a titanium alloy, or (ii) performing anodic oxidation on the surface of the base material under conditions of high current density; and performing annealing on the resulting film formed on the base material.

(11) The method according to (10), characterized in that the conditions of current density are 25 mA/cm$^2$ or higher.

(12) The method according to (10) or (11), characterized in that the anodic oxidation is performed for a duration of 2 minutes or longer.

(13) The method according to (10), characterized in that the voltage is 100 V or higher.

(14) The method according to (10) or (13), characterized in that the anodic oxidation is performed for a duration of 2.2 hours or longer.

(15) The method according to any of (10) to (14), characterized in that the anodic oxidation is performed in an electrolyte of sulfuric acid concentration ranging from 2.6 to 14.1 wt %.

(16) The method according to any of (10) to (15), characterized in that the annealing is performed at a temperature ranging from 400 to 1000° C.

(17) The method according to any of (10) to (16), characterized in that the annealing is performed for a duration of 1 hour or longer.

(18) The method according to any of (1) to (17), characterized in that the rutile-structured titanium dioxide exhibits high crystallinity and contains 60% or more of rutile-structured titanium dioxide in which the half-value width of the rutile 110 diffraction line in an X-ray diffraction pattern is less than 0.4.

(19) The method according to any of (1) to (18), characterized in that the rutile-structured titanium dioxide is doped with sulfur.

(20) The method according to any of (1) to (19), characterized in that the rutile-structured titanium dioxide is doped with sulfur and contains 200 ppm (0.02%) to 4000 ppm (0.4%) of sulfur in the titanium dioxide.

(21) The method according to any of (1) to (20), characterized in that the rutile-structured titanium dioxide is doped with sulfur and contains sulfur ranging from 400 ppm (0.04%) to 2000 ppm (0.2%) in the titanium dioxide.

(22) The method according to any of (1) to (21), characterized in that the rutile-structured titanium dioxide is doped with sulfur and contains sulfur ranging from 600 ppm (0.06%) to 1500 ppm (0.15%) in the titanium dioxide.

(23) The method according to any of (1) to (22), characterized in that the rutile-structured titanium dioxide is doped with sulfur and contains sulfur ranging from 800 ppm (0.08%) to 1200 ppm (0.12%) in the titanium dioxide.

(24) A photocatalyst of a titanium dioxide formed on a surface of a titanium or a titanium alloy, the titanium dioxide photocatalyst characterized in containing 60% or more of rutile-structured titanium dioxide in which the half-value width of the rutile 110 diffraction line in an X-ray diffraction pattern is less than 0.4.

(25) A photocatalyst characterized in being titanium dioxide manufactured by applying a voltage (for example, a high voltage) or performing anodic oxidation under conditions of high current density on a surface of a titanium or a titanium alloy, or being titanium dioxide manufactured by further performing annealing on the titanium dioxide, and having a titanium dioxide thin-film containing 60% or more of rutile-structured titanium dioxide in which the half-value width of the rutile 110 diffraction line in an X-ray diffraction pattern is less than 0.4.

(26) The photocatalyst according to (24) or (25), characterized in that the rutile-structured titanium dioxide is doped with sulfur.

(27) The photocatalyst according to any of (24) to (26), characterized in that the rutile-structured titanium dioxide is doped with sulfur and contains sulfur ranging from 200 ppm (0.02%) to 4000 ppm (0.4%) in the titanium dioxide.

(28) The photocatalyst according to any of (24) to (27), characterized in that the rutile-structured titanium dioxide is doped with sulfur and contains sulfur ranging from 400 ppm (0.04%) to 2000 ppm (0.2%) in the titanium dioxide.

(29) The photocatalyst according to any of (24) to (28), characterized in that the rutile-structured titanium dioxide is doped with sulfur and contains sulfur ranging from 600 ppm (0.06%) to 1500 ppm (0.15%) in the titanium dioxide.

(30) The photocatalyst according to any of (24) to (29), characterized in that the rutile-structured titanium dioxide is doped with sulfur and contains sulfur ranging from 800 ppm (0.08%) to 1200 ppm (0.12%) in the titanium dioxide.

(31) A method for manufacturing a titanium dioxide photocatalyst containing 60% or more of rutile-structured titanium dioxide in which the half-value width of the rutile 110 diffraction line in an X-ray diffraction pattern is less than 0.4 by applying a high voltage or performing anodic oxidation under conditions of high current density on a surface of a titanium or a titanium alloy.

(32) The method according to (31) characterized in that the titanium dioxide is doped with sulfur and contains sulfur ranging from 200 ppm (0.02%) to 4000 ppm (0.4%) in the titanium dioxide, the titanium dioxide being a titanium dioxide photocatalyst containing least 60% of rutile-structured titanium dioxide in which the half-value width of the rutile 110 diffraction line in an X-ray diffraction pattern is less than 0.4.

Effect of the Invention

Rutile-structured titanium dioxide simultaneously provided with the two excellent functions of superhydrophilicity and oxidative degradation characteristics is formed as a film on titanium or a titanium alloy by anodic oxidation, making it possible to provide a material having excellent photocatalytic activity and endowed with superhydrophilicity even without ultraviolet light irradiation. Such titanium dioxide can provide antibacterial, deodorant, water purifying, antisoiling, air purifying, and other effects due to the oxidative degradation effect, and can provide an anti-fogging effect due to the superhydrophilic effect at the same time.

The material having a rutile-structured titanium dioxide layer on the surface of a titanium or titanium alloy base material obtained using the technique according to the present invention has excellent photocatalytic activity and excellent superhydrophilicity, and is a material having excellent deodorization, antifungal properties, antisoiling properties, bactericidal action, and the like. The rutile-structured titanium dioxide layer has exceptional adhesion with the base material, and the film is highly resistant against spalling and damage during handling, and can therefore be employed effectively in a variety of members used for building materials, air-conditioning equipment, water-purifying systems, and other applications having antifungal, antisoiling, and other effects.

Other objects, characteristics, advantages, and aspects of the present invention will be apparent to one skilled in the art from the description given below. However, it should be understood that the following description and the description of the present specification, which includes specific examples and the like, merely show preferred modes of the present invention and are given only by way of explanation. It will be clearly apparent to one skilled in the art from the information given in the following description and other portions of the present specification that various changes and/or improvements (or modifications) are possible within the intention and scope of the present invention as disclosed in the present specification. All patent references and other references cited in the present specification are cited for descriptive purposes, and the contents of the references shall be construed as being included in the disclosure of the present specification as part of the present specification.

MODE FOR CARRYING OUT THE INVENTION

Figure 1:
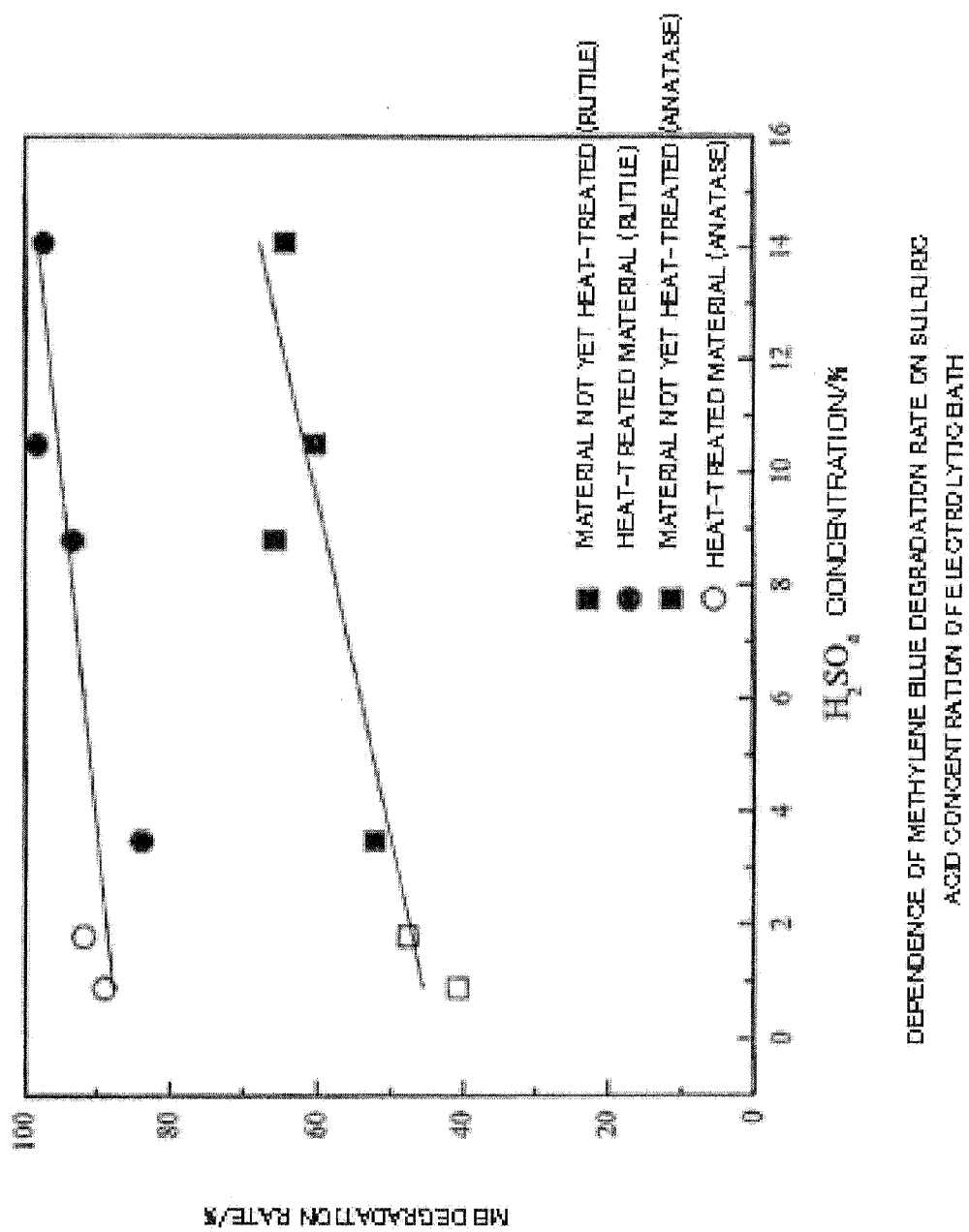
FIG. 1 illustrates the reaction rate constant of methylene blue degradation against the sulfuric acid concentration in the electrolyte for titanium dioxide thin film obtained by anodic oxidation.

The present invention provides a method for forming a titanium dioxide thin film having excellent photocatalytic activity and superhydrophilicity on a titanium or titanium alloy base material using anodic oxidation.

The present invention is based on the view that oxygen vacancies are readily formed in titanium dioxide having a rutile structure by ultraviolet irradiation, with the result that adsorption of hydroxyl groups on the oxygen vacancies is facilitated, and improved superhydrophilicity are obtained. The present invention also includes capillary effect whereby water droplets penetrate through micro-sized pores. Another original idea that is used in this case is that although conventional wisdom holds that the anatase phase has better photocatalytic capacity than does the rutile phase, a titanium dioxide thin film provided with excellent photocatalytic activity and superhydrophilicity by anodic oxidation can be effectively obtained by improving crystallinity of rutile structure. An equilibrium annealing is preferred for improving the crystallinity of titanium dioxide, and the heretofore undesirable rutile phase that is stable at high temperatures is formed in cases in which the conditions for the annealing are not optimal. According to the present invention, however, a titanium dioxide film formed by anodic oxidation is obtained as a high activity rutile-structured titanium dioxide having excellent photocatalytic activity, superhydrophilicity, and the like. The anodic oxidation film prepared by these conditions is therefore suitable for annealing, and a highly functional film capable of simultaneously fulfilling the two functions of superhydrophilicity and oxidative degradation characteristics can be manufactured by performing a designated annealing on anodized oxide.

A base material formed of a titanium-containing metal material can be cited as an example of the base material used in the present invention. Other examples include base materials formed of titanium (including pure titanium) or a titanium alloy. The term "titanium alloy" includes titanium-containing alloys. An anodic oxidation film including rutile-structured titanium dioxide is formed on the substrate by subjecting the titanium-containing metal material to anodic oxidation under the application of voltage to obtain rutile-structured titanium dioxide with photocatalytic activity and superhydrophilicity characteristics. In another embodiment, an anodized oxide film including rutile-structured titanium dioxide is formed on the substrate by anodic oxidation of the titanium-containing metal material under conditions of high current density to obtain rutile-structured titanium dioxide with photocatalytic activity and superhydrophilicity characteristics. The titanium-containing metal material may be pure titanium composed of substantially 100% titanium, and the term "substantially" used herein may be defined as encompassing the presence of impurities and mixtures in amounts having no adverse effect on the present invention. Examples of pure titanium include JIS1 type, JIS2 type, JIS3 type, JIS4 type, ASTM G1, ASTM G2, ASTM G3, ASTM G4, AMS4902, AMS4900, AMS4901, AMS4921, and the like. In typical cases, the titanium content of the entire alloy used for the substrate in the film-forming portion (on the surface, in the vicinity thereof, or the like) is preferably 80% or greater from the standpoint of the photocatalytic activity and superhydrophilicity characteristics of the resulting metal material.

Constitutional elements other than titanium is not subject to any particular limitations as long as there is good compatibility with the titanium and may be chosen from a variety of elements in accordance with the objective; a metal known in the field may be used.

Examples of titanium alloys include titanium base alloys and may be materials containing at least one type of element selected from the group consisting of Group 5 elements (Group 5A elements), Group 6 elements (Group 6A elements), Group 7 elements (Group 7A elements), iron group elements, platinum group elements, Group 11 elements (Group 1B elements), Group 14 elements (Group 4A elements), Group 3 elements (including Group 3A elements, lanthanoids, actinoids, and misch metals); materials containing at least one type of element that forms intermetallic compounds with titanium; and the like.

Examples of typical elements compounded with a titanium alloy include: V, Nb, Ta, and other elements from the Group 5 elements; Cr, Mo, W, and other elements from the Group 6 elements; Mn, Re, and other elements from the Group 7 elements; Fe, Co, Ni, and other elements from the iron group elements; Ru, Rh, Pd, Os, Ir, Pt, and other elements from the platinum group elements; Cu, Ag, Au, and other elements from the Group 11 elements; Si, Sn, Pb, and other elements from the Group 14 elements; and Y, La, Ce, Nd, Sm, Tb, Er, Yb, Ac, and other elements from the Group 3 elements. These may be alloyed with Ti individually or in combination. In typical cases, the titanium alloy preferably used in the present invention may, for example, be a titanium alloy containing at least one of the elements Mo, Nb, Ta, V, Ag, Co, Cr, Cu, Fe, Mn, Ni, Pb, Si, and W as the alloy element.

Materials known in the field may be used as the typical titanium alloys. Examples include Ti—Nb—Sn alloys, Ti—Fe—O alloys, Ti—Fe—O—Si alloys, Ti—Pd alloys, Ti—Ni—Pd—Ru—Cr alloys, Ti—Al—V alloys, Ti—Al—Sn—Zr—Mo alloys, T Al—Mo—V—Fe—Si—C alloys, Ti—V—Cr—Sn—Al alloys, Ti—Mo—Zr—Al alloys, Ti—Mo—Ni alloys, Ti—Ta alloys, Ti—Al—Sn alloys, Ti—Al—Mo—V alloys, Ti—Al—Sn—Zn—Mo—Si—C—Ta alloys, Ti—Al—Nb—Ta alloys, Ti—Al—V—Sn alloys, Ti—Al—Sn—Zr—Cr—Mo alloys, Ti—V—Fe—Al alloys, Ti—V—Cr—Al alloys, Ti—V—Sn—Al—Nb alloys, Ti—Al—Nb alloys, Ti—Al—V—S alloys, and the like. It is possible to use, for example, titanium alloys such as Ti-5Al-2.5Sn alloys, Ti-6Al-4V alloys, Ti-15Mo-5Zr-3A1 alloys, and the like.

In the technique according to the present invention, anodic oxidation is performed after the metallic base material formed of titanium or a titanium alloy is processed in advance into a sheet, a foil, or a desired shape suitable for intended use (this includes shapes plated with titanium or a titanium alloy). The shape of the metallic base material is not subject to any particular limitations and may be a sheet, a rod, a cylinder, a mesh, a fiber, a porous material (sponge), a bulk article formed by compressing a powder or fiber, or an aggregated material. The bulk article in the desired shape is usually cleaned on the surface and then oxidized. The base material may undergo annealing or another pretreatment before being subjected to anodic oxidation. The anodic oxidation treatment allows a uniform and dense treatment to be performed, can be applied to complicated shapes in a simpler manner, and is advantageous for the adhesive strength of the layer having photocatalytic activity.

In the technique according to the present invention, the base material is subjected to anodic oxidation in an acid aqueous electrolyte. Typical examples of electrolyte include dilute sulfuric acid and other dilute mineral acid. A concentration of sulfuric acid capable of yielding the required effect can be selected as the concentration of sulfuric acid in the dilute sulfuric acid aqueous solution. Examples include 2.1 to 15.8 wt % or 2.6 to 14.9 wt %, more preferably 2.6 to 14.1 wt % or 3.5 to 14.4 wt %, even more preferably 7.9 to 14.4 wt %, and most preferably 8.8 to 14.1 wt %. According to another aspect, anodic oxidation may be performed so that the concentration of sulfuric acid in the dilute sulfuric acid aqueous solution is 8.8 to 12.3 wt % or 8.8 to 11.4 wt %, more preferably 9.7 to 11.4 wt %, and most preferably about 10.5 wt %.

The applied voltage between the electrodes during anodic oxidation may correspond to a potential of, for example, 50 to 500 V, more preferably 100 to 500 V, even more preferably 150 to 500 V, further preferably 160 to 500 V, and most preferably 210 to 450 V. In certain cases, anodic oxidation may be performed at a potential of 100 to 400 V, and more preferably 150 to 400 V. According to another aspect, anodic oxidation may be performed at a potential of 100 to 350 V, and most preferably 150 to 300 V. Anodic oxidation may sometimes be performed at a potential of 200 to 400 V, and more preferably 220 to 350 V, and may further be performed at a potential that is preferably 240 to 375 V, and most preferably 240 to 300 V.

Anodic oxidation may be performed for 1 to 100 hours, more preferably 1 to 48 hours, and even more preferably 1 to 12 hours, and may be further performed for 1.5 to 5 hours or 1.5 to 3 hours.

According to another aspect, the current density can be increased instead of increasing the applied voltage. The current density is calculated from the ratio of current to the sample surface area. A current density capable of yielding the required effect can be selected as the current density during anodic oxidation. The preferred effect can be obtained, for example, with at least 25 mA/cm$^2$ or higher, ideally 30 mA/cm$^2$ or higher, and further 50 mA/cm$^2$ or higher. 70 mA/cm$^2$ or higher is sometimes preferred, and may be 100 mA/cm$^2$ or higher. In cases in which high current density can be applied, the applied voltage can, for example, be 100 to 500 V, and anodic oxidation may be performed at a potential of 120 to 500 V, preferably 150 to 500 V, more preferably 180 to 500 V, and most preferably 200 to 450 V. According to this aspect, anodic oxidation may be performed for 1 minute to 100 hours, preferably 2 minutes to 48 hours, and more preferably 3 minutes to 12 hours, may be further performed for 9 minutes to 5 hours or 10 minutes to 3 hours, and may be even further performed for 20 minutes to 3 hours.

Anodic oxidation is typically performed at room temperature. An anodic oxidation treatment may be performed by applying a direct current, AC/DC, or pulse waves. Anodic oxidation can also be performed by applying a single-phase half-wave, three-phase half-wave, or six-phase half-wave using a thyristor-based DC power source.

The anodic oxidation treatment can provide dense and uniform surface oxidation, and can therefore be applied to metal materials having complicated shapes and process these materials in a simple and uniform manner into materials having excellent photocatalytic function and superhydrophilicity characteristics. The film thickness of the anodized oxide film can be controlled by controlling the applied voltage. The film thickness of the resulting anodic oxidation film can also be controlled by controlling the current density during anodic oxidation. The anodic oxidation treatment is a very simple technique and is convenient to a film on a large surface area. Anodic oxidation is also a commercially used method capable of forming a film on a base material having a complicated shape.

In a typical aspect, anodic oxidation treatment is performed as follows. A bulk article (for example, a base material shaped as a plate) with a desired shape of a pretreated titanium-containing metal material is connected to an anode, and a pure titanium plate is connected to a cathode. An electric cell is filled with an aqueous solution (8.8 wt % sulfuric acid aqueous solution in this aspect) containing a suitable electrolyte, and the bulk article and pure titanium plate are submerged therein. Electrical power is supplied from a DC power supply while a voltmeter and ammeter are monitored to adjust the direct current, and anodic oxidation treatment is performed at a voltage of about 210 to 500 V (a voltage of about 120 to 500 V in cases in which the current density is at least 25 mA/cm$^2$ or higher). More specifically, the resulting bulk metal material is attached to an anode; anodic oxidation is performed at a voltage of 210 to 500 V (or anodic oxidation is performed under conditions of a current density of at least 25 mA/cm$^2$ or higher) in the 8.8 wt % sulfuric acid aqueous solution; the metal material, particularly the titanium contained therein, is oxidized; and a rutile-structured titanium dioxide film (anodic oxidized film) is formed on the surface of the metal material. The base material subjected to anodic oxidation is typically thoroughly rinsed with distilled water. The anodized oxide may also be cleaned by methanol, ethanol, acetone, or another organic solvent.

In the technique according to the present invention, an annealing performed after the anodic oxidation is preferably carried out in an oxidizing atmosphere in the temperature ranging from 300 to 1000° C., more preferably 300 to 1000° C., and further preferably 400 to 600° C. The preferred annealing time in this temperature range is about 30 minutes to 10 hours, but is preferably about 3 to 10 hours in cases in which the annealing is performed at about 300° C., and about 1 to 5 hours in cases in which the annealing is performed at about 450° C. The oxidizing atmosphere is not subject to any particular limitations, but is typically an oxygen-containing atmosphere. The air atmosphere can usually be selected as an example. The anodic oxidized film formed on the surface of the substrate is fixed by the annealing to allow strength and adhesion to be enhanced, and photocatalytic and superhydrophilic characteristics to be improved. According to the present invention, a photocatalyst having superhydrophilicity that have a variety of characteristics can be manufactured by properly modifying the type and shape of the base material, the anodic oxidation conditions, and the annealing conditions.

According to a typical aspect of the method of the present invention, there is provided a method for manufacturing rutile-structured titanium dioxide having high crystallinity by subjecting a base material formed of titanium or a titanium alloy as described above to anodic oxidation in which a voltage of about 100 to about 500 V is applied to the surface thereof for about 2.5 to about 10 hours in a sulfuric acid aqueous solution having a concentration of from about 7.9 to about 14.1 wt %, and then subjecting the resulting film formed on the base material to an annealing at a temperature of about 400 to about 600° C. for between about 1 to about 20 hours.

According to another typical aspect of the present invention, there is provided a method for manufacturing rutile-structured titanium dioxide having high crystallinity by subjecting a base material formed of titanium or a titanium alloy as described above to anodic oxidation in which a high voltage of about 200 to about 500 V is applied to the surface thereof for about 0.25 to about 5 hours in a sulfuric acid aqueous solution having a concentration of from about 8.8 to about 14.1 wt %, and then subjecting the resulting film formed on the base material to an annealing at a temperature of about 400 to about 600° C. for between about 1 to about 20 hours.

According to a typical aspect of the present invention, there is provided a method for manufacturing rutile-structured titanium dioxide having high crystallinity by applying a high voltage to a surface of a base material formed of titanium or a titanium alloy and subjecting the film produced by the anodic oxidation to an annealing, wherein the voltage is 100 V or higher, the anodic oxidation is performed for a period of 2.5 hours or longer, the anodic oxidation is then performed in a sulfuric acid aqueous solution having a concentration of from 8.8 or higher to 14.1 wt %, and the annealing is performed at a temperature of from 400° C. or higher to 1000° C. for 1 hour or longer.

According to another typical aspect of the present invention, there is provided a method for manufacturing rutile-structured titanium dioxide having high crystallinity by applying a high voltage to a base material formed of titanium or a titanium alloy and subjecting the film produced by anodic oxidation to an annealing, wherein the high voltage is 200 to 250 V, the anodic oxidation is performed for a period of 0.5 to 5 hours, the anodic oxidation is then performed in a sulfuric acid aqueous solution having a concentration of 8.8 to 14.1 wt %, and the annealing is performed at a temperature of 350 to 500° C. for 1 to 6 hours. According to a further aspect of the present invention, the method is carried out under an electric current density of 25 mA/cm$^2$ or higher in addition to the aforementioned conditions. According to another typical aspect of the present invention, the method is carried out under an electric current density of 40 mA/cm$^2$ or higher in addition to the aforementioned conditions. According to still another typical aspect of the present invention, the method is carried out under an electric current density of 40 to 100 mA/cm$^2$ in addition to the aforementioned conditions.

According to another typical aspect of the present invention, there is provided a method for manufacturing rutile-structured titanium dioxide having high crystallinity by applying a voltage of about 120 to about 500 V to a base material formed of titanium or a titanium alloy for about 2 minutes to about 5 hours in a sulfuric-acid aqueous solution having a concentration of about 7.9 to about 14.4 wt % under the conditions of an electric current density of at least 25 mA/cm$^2$ or higher, such as 30 mA/cm$^2$ or higher (current density conditions may be 50 mA/cm$^2$ or higher, 70 mA/cm$^2$ or higher, or 100 mA/cm$^2$ or higher), to perform anodic oxidation, and then subjecting the resulting film formed on the base material to an annealing at a temperature of about 400 to about 600° C. for about 1 to about 20 hours.

Figure 2:
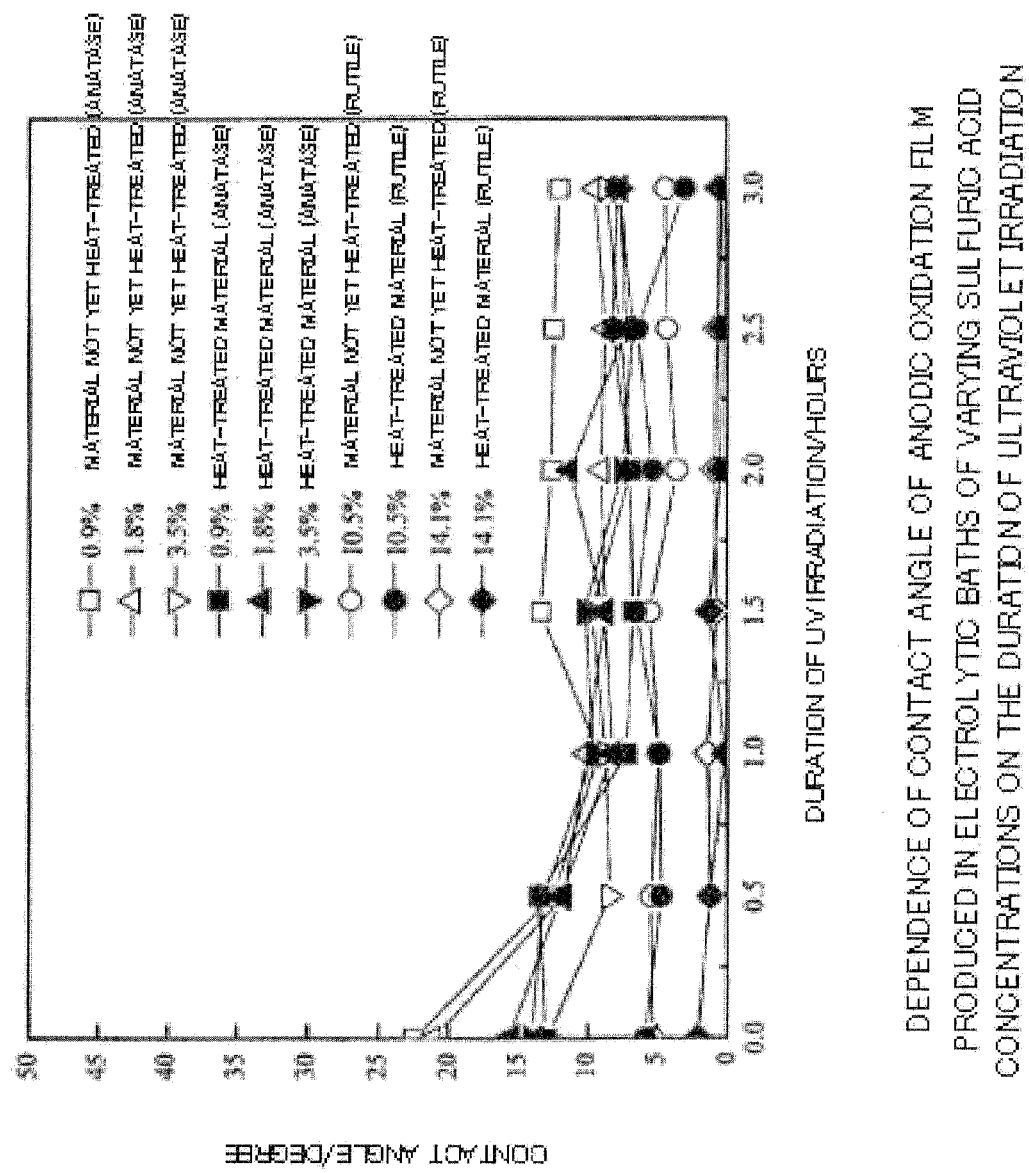
FIG. 2 illustrates the contact angle against the time at which the water droplet falls on the oxide after ultraviolet light illumination for titanium dioxide thin film obtained by anodic oxidation.
Figure 3:
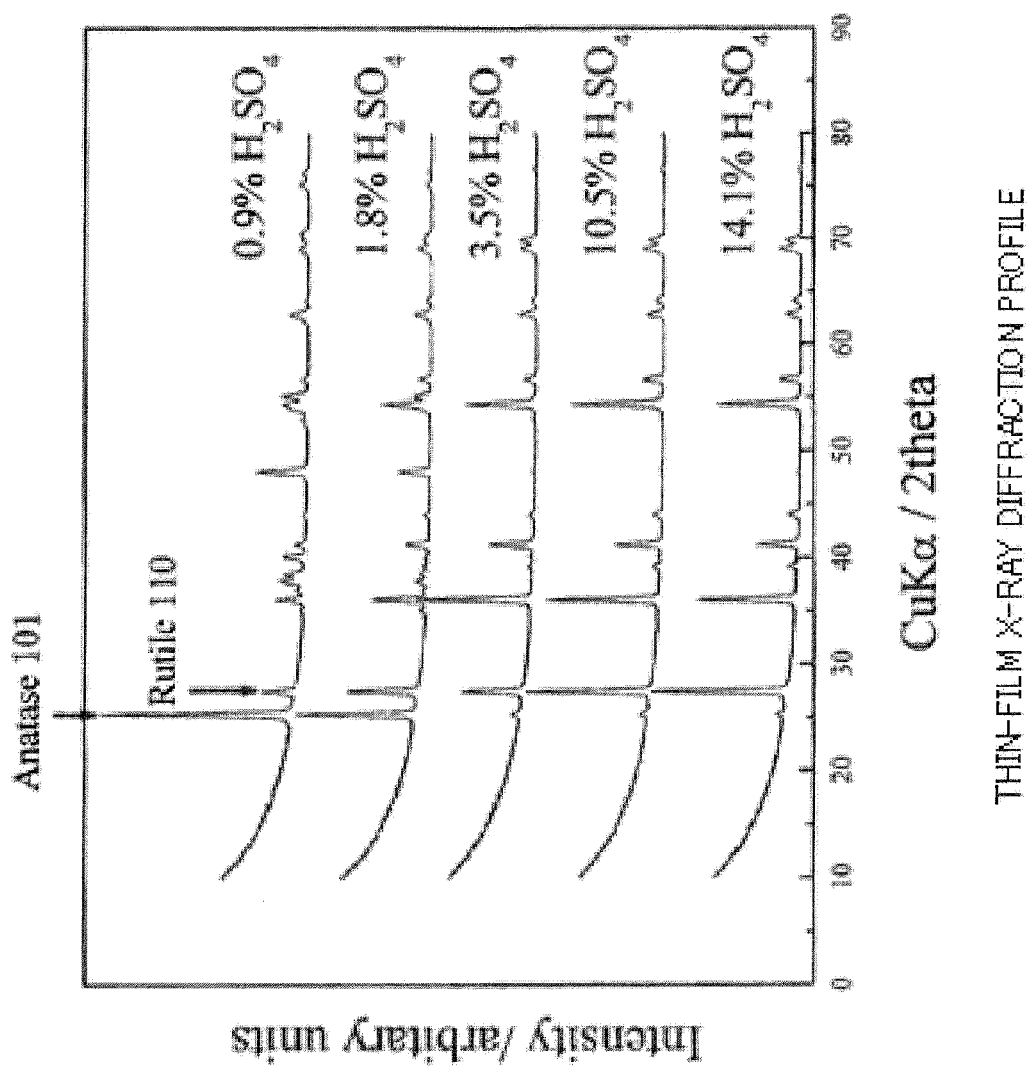
FIG. 3 illustrates a thin-film X-ray diffraction profile of titanium dioxide thin film obtained by anodic oxidation.

The present invention provides a material obtained by the method disclosed in the present specification, provided with a rutile-structured titanium dioxide layer on a substrate, and endowed with exceptional photocatalytic activity and superhydrophilic characteristics. The material is a base material having a rutile-structured titanium dioxide layer for which the data shown in FIGS. 1 through 3 represents the characteristic values of the material. The characteristics of the material may be the MB degradation rate obtained in photocatalytic performance tests and/or the contact angle obtained in superhydrophilicity tests. The rutile-structured titanium dioxide having high crystallinity obtained in the present invention refers to a material for which the content of rutile-structured titanium dioxide in which the half-value width of the rutile 110 diffraction line in a thin-film X-ray diffraction pattern is less than 0.4 is at least 60% or higher, preferably at least 70% or higher, more preferably at least 85% or higher, very preferably at least 90% or higher, and most preferably at least 95% or higher. In a typical case, the rutile-structured titanium dioxide on a substrate obtained in the present invention refers to a titanium dioxide layer containing at least 90% or more of rutile-structured titanium dioxide in which the half-value width of the rutile 110 diffraction line in a thin-film X-ray diffraction pattern is less than 0.4. In a typical example, the rutile-structured titanium dioxide on a substrate obtained in the present invention refers to a titanium dioxide thin film containing at least 95% or more of rutile-structured titanium dioxide in which the half-value width of the rutile 110 diffraction line in a thin-film X-ray diffraction pattern is less than 0.4.

According to the present invention, the rutile-structured titanium dioxide substance formed on a base material has excellent visible-light response properties. The substance of the rutile-structured titanium dioxide film was discovered to have sulfur (S). Various attempts have been made in the past to add S to titanium dioxide structures, but satisfactory visible-light response properties have not been achieved in actual practice to the extent they are achieved in the product obtained by the present invention, and the resulting products could hardly have been regarded as those in which the titanium dioxide is doped with S, as in the present invention. Based on the analysis of several examples of the substance of the rutile-structured titanium dioxide film formed on a base material in accordance with the present invention, it was discovered that the film thickness is approximately 7 μm and that the titanium dioxide can be securely doped with S up to a concentration 1441 ppm (0.144%). Following from this, it can be suggested that the maximum concentration of S in the titanium dioxide is about 4000 ppm (0.4%), and the minimum concentration of S is at or below 250 ppm (0.025%), for example, about 200 ppm (0.02%). According to a typical aspect, the substance of the rutile-structured titanium dioxide film formed on a base material in accordance with the present invention is doped by sulfur, and the substance contains 400 ppm (0.04%) to 2000 ppm (0.2%) of sulfur in the titanium dioxide, occasionally 600 ppm (0.06%) to 1500 ppm (0.15%) of sulfur in the titanium dioxide, and preferably 800 ppm (0.08%) to 1200 ppm (0.12%) in the titanium dioxide.

Material obtained by the method according to the present invention and provided with a rutile-structured titanium dioxide thin film having photocatalytic properties and excellent superhydrophilicity exhibits deodorization, antifungal properties, antisoiling properties, bactericidal action, and the like, and can be employed effectively in a variety of members used for building materials, air-conditioning equipment, water-purifying systems, and other applications having antifungal, antisoiling, and other effects.

The metal material of the present invention can be used without alteration in metal tiles and as interior material, and can also be used as a composite material obtained by a method in which a thin plate of metal material having a structure according to the present invention is produced and joined to ceramics, mortar, glass, iron sheets, aluminum sheets, and other ready-made building materials. With the method in which the material is used by being joined to a ready-made material in this manner, the consumption of metal material having photocatalytic properties can be reduced, and a variety of composite materials having excellent deodorant properties, bactericidal function, and other photocatalytic properties can be provided inexpensively.

Material obtained by the method of the present invention and provided with a rutile-structured titanium dioxide thin film having photocatalytic properties and excellent superhydrophilicity can be used for water purification. Water purification can be performed by using the rutile-structured titanium dioxide thin film to remove dilute organic matter from the water under clean light energy.

Material obtained in the method according to the present invention and provided with a rutile-structured titanium dioxide film can be used for a variety of building materials, including those for industrial plants, and materials including those for other equipment, medical uses, and the like. Examples include materials for the interior of buildings, exterior materials, utensils for food preparation, dinnerware, hygienic instruments, air-conditioning equipment, materials for sewage pipes and other public works, sound insulation walls for highways, and materials for refrigerators and other food storage cabinets. A substance can be supplied in which the photocatalytic action possessed by the material obtained in the present invention is used to provide self-cleaning, air-cleaning, and bactericidal action. When the rutile-structured titanium dioxide obtained by the method of the present invention is irradiated by ultraviolet light from sunlight, lighting equipment, or the like, light energy is converted to chemical energy, photocatalytic reaction for degrading organic matter and the like is exerted, and antibacterial, deodorant, and antisoiling effects are obtained in addition to the degradation and removal of formaldehyde, which is a typical allergen generated in offices and rooms in houses.

The present invention is described in detail with reference to the examples below, but the examples are provided merely to explain the present invention and to serve as a reference for specific embodiments thereof. These examples are designed to describe particular specific embodiments of the present invention, and do not represent limitations or restrictions on the scope of the invention disclosed in the present application. It should be understood that a variety of embodiments are possible based on the ideas of the present specification. All of the examples, other than those cited in detail, were and can be performed using standard techniques, and are well-known and conventional to a person skilled in the art.

Example 1

[Formation of Titanium Dioxide Film]

Polishing was conducted on the surface of a Ti rolled plate with dimensions of 20 mm×10 mm that was to be used as the anode in a sulfuric acid electrolyte having a concentration of any of (1) 0.9 wt %, (2) 1.8 wt %, (3) 3.5 wt %, (4) 8.8 wt %, (5) 10.5 wt %, or (6) 14.1 wt %. Anodic oxidation was performed for 30 minutes at a current of 100 mA and a conversion voltage of (a) 210 V or (b) 220 V. The anodic oxidation was performed at room temperature. After anodic oxidation, the material was rinsed with methanol, then dried at room temperature, and made into a material sample that had not yet been annealed. This base material was subjected to atmospheric oxidation for 5 hours at 450° C. and made into an annealed material sample.

[Photocatalytic Activity Test]

The sample was placed in a quartz cell containing a 25-ppm methylene blue aqueous solution and irradiated with ultraviolet light at 365 nm for a designated period of time (1, 2, 6, or 21 hours). After being irradiated for a set period of time, the methylene blue aqueous solution was removed from the quartz cell, and the methylene blue degradation rate was calculated by using a UV-Vis spectrophotometer from the change in methylene blue absorbance at 664 nm. The results are shown in FIG. 1. In FIG. 1, the square symbols represent samples of materials that have not yet been annealed, and the circular symbols represent samples of annealed materials. The black circular symbols and black square symbols represent materials in which rutile-structured titanium dioxide has been observed, and the white circular symbols and white square symbols represent materials in which anatase-structured titanium dioxide has been observed.

It is understood from these results that the degradation rate of methylene blue is high in the rutile-structured titanium dioxide thin film obtained by anodic oxidation. It is also understood that the degradation rate of methylene blue improves with annealing.

[Superhydrophilicity Test]

A sample was irradiated for a designated period of time (0.5, 1, 1.5, 2, 2.5, or 3 hours) by 365-nm ultraviolet light at an intensity of 0.2 mW/cm². After being irradiated for a set period of time, 1.0 µL of distilled water was dropped on the sample, and the contact angle was measured by the θ/2 method. The results are shown in FIG. 2. In FIG. 2, the white symbols represent samples of materials that have not yet been annealed, and the black symbols represent samples of annealed materials. The circular and diamond symbols represent materials in which rutile-structured titanium dioxide has been observed, and the square, normal triangle, and inverted triangle symbols represent materials in which anatase-structured titanium dioxide has been observed.

It is understood from these results that the contact angle is reduced and excellent superhydrophilicity are achieved even without irradiation by ultraviolet light in a rutile-structured titanium dioxide thin film obtained by anodic oxidation. It is also understood that superhydrophilicity are improved by annealing.

[Thin-Film X-Ray Diffraction Analysis]

The crystal structure of a thin-film sample was examined by using X-ray diffraction with a thin-film geometry arrangement. An X-ray diffraction profile is shown in FIG. 3.

It was discovered from these results that anatase-structured titanium dioxide is recognized with the 110 peak of the rutile in the anodic oxide prepared in the sulfuric acid concentration lower than 1.8 wt %, whereas the formation of rutile-structured titanium dioxide is clearly observed in the anodic oxide prepared in the sulfuric acid concentration higher than 3.5 wt %, and rutile-structured titanium dioxide primarily observed in the anodic oxide prepared in the sulfuric acid concentration higher than 10.5 wt %.

Contrary to expectation, exceptional photocatalytic characteristics can thus be obtained in the rutile-structured titanium dioxide, which has been regarded as poor photocatalyst. It was also confirmed that a rutile-structured titanium dioxide thin film has exceptional superhydrophilicity.

Figure 4:
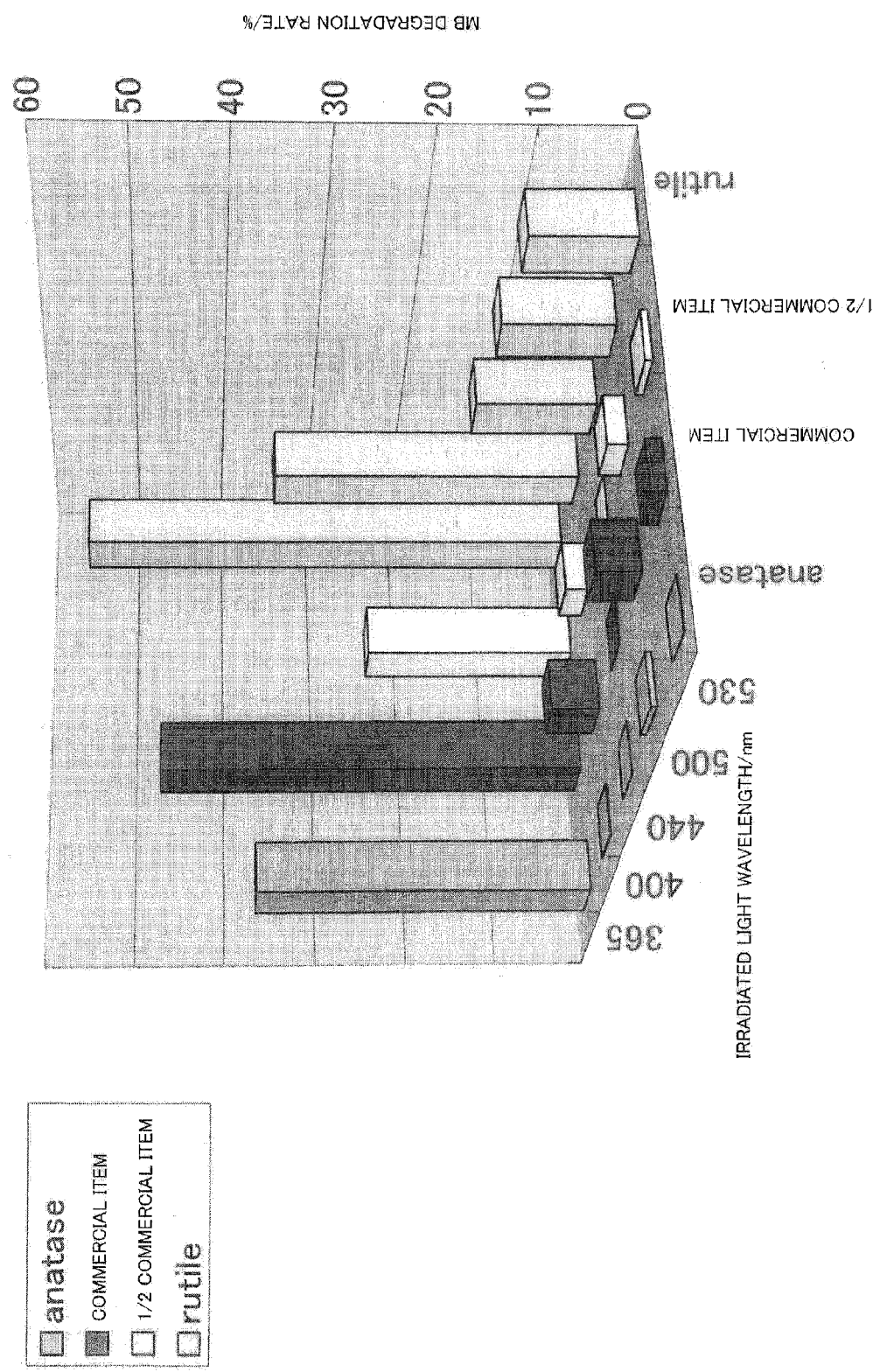
FIG. 4 illustrates the methylene blue degradation rate under visible light illumination for titanium dioxide thin film obtained by anodic oxidation.
Figure 5:
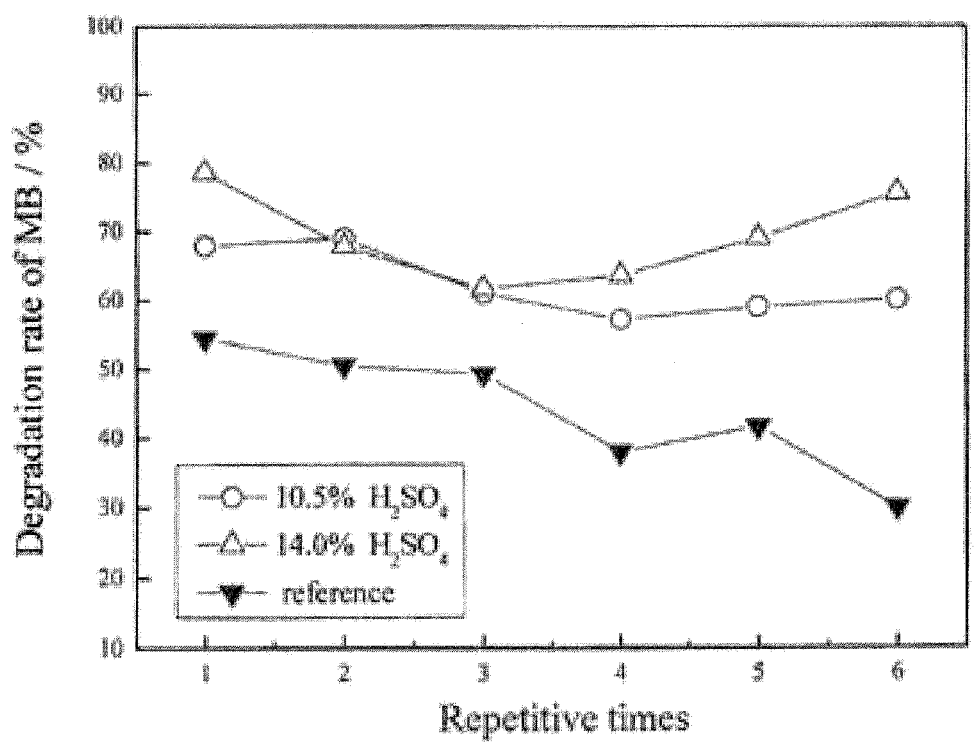
FIG. 5 illustrates the degradation rate of methylene blue in the sequential bleaching test against the repetitive test times in which titanium dioxide formed by anodic oxidation in the electrolyte with a sulfuric acid concentration of 1.2 M (10.65 wt. %) $H_2SO_4$ and 1.6 M (14.38 wt. %) $H_2SO_4$ and titanium dioxide (reference) formed by dry coating were evaluated.

The rutile-structured titanium dioxide substance formed on a base material in accordance with the present invention has excellent visible-light response properties. In a methylene blue bleaching test for evaluating photocatalytic activity, the substance was irradiated with light of a wavelength of 365, 400, 440, 500, and 530 nm to evaluate visible-light response properties. The results are shown in FIG. 4. Visible light is ranged from 360-400 nm on the short wavelength side to from 760-830 nm on the long wavelength side; light having wavelengths shorter than these is referred to as ultraviolet light, and light having wavelengths longer than these is referred to as infrared light. The substance in the present invention (in FIG. 4, rutile-structured titanium dioxide obtained in a 10.5% sulfuric acid aqueous solution is shown as "rutile") is endowed with excellent photocatalytic activity in a comparatively extended visible light range.

Each of the rutile-structured titanium dioxides obtained in sulfuric acid aqueous solutions of 3.5, 10.5, and 14.1% as shown in FIG. 3 has visible-light response, but the titanium dioxide obtained using a sulfuric acid aqueous solution of 0.9% has negligible in visible-light activity.

The substance in the rutile-structured titanium dioxide thin film was discovered to contain sulfur (S) in the titanium dioxide. Specifically, doping with S can be confirmed by X-ray photoemission spectroscopy, Auger electron spectroscopy, or other analytical devices. The amount of sulfur was determined by measuring the gas which had been extracted from the anodic oxide on titanium substrate during combustion and it was discovered that doping can be performed securely until the concentration of S reaches 1441 ppm (0.144%) at a film thickness of about 7 µm in a substance in the rutile-structured titanium dioxide thin film formed on a base material according to the present invention.

Compared with a substance in which a titanium dioxide photocatalyst is formed by coating on the surface of a metal plate, by using chemical vapor deposition or physical vapor deposition, or by using thermal spraying, the substance obtained by the anodic oxidation method of the present invention is one in which the surface of a titanium metal plate is oxidized to produce titanium dioxide, and the base material of titanium is continuously converted to titanium dioxide. Therefore, the substance has strong adhesive strength, and it does not readily peel from the substrate. Furthermore, it shows acid and alkali resistance, possesses superhydrophilicity, and has excellent corrosion resistance and durability.

The photocatalytic activity with sequential usages were evaluated in repeated methylene blue degradation tests in which photocatalytic activity was evaluated for the titanium dioxide on a titanium base material by anodic oxidation in a sulfuric acid aqueous solution of 1.2 M (10.65 wt. %) or 1.6 M (14.38 wt. %) with the titanium oxide obtained by dry coating as reference. The degradation rate of the reference gradually decreased with repetitive tests, whereas that in the rutile-structured oxide prepared by anodic oxidation is not deficient as compared to the reference.

INDUSTRIAL APPLICABILITY

Rutile-structured titanium dioxide having high crystallinity according to the present invention possesses excellent superhydrophilicity and photocatalytic activity, and can therefore be used as a substance endowed with deodorization properties, antifungal properties, antisoiling properties, bactericidal action, and the like, and can be employed in a variety of members used for medical materials, building and public works materials, air-conditioning equipment, water-purifying systems, and the like. In particular, a base material having a rutile-structured titanium dioxide thin film layer according to the present invention can be used for water purification and for removing dilute organic matter in water using clean light energy.

It is apparent that the present invention can be executed in all aspects, including those not particularly described in the aforementioned description and examples. Various variations and modifications of the present invention can be made in view of the aforementioned teachings, and these are therefore also within the scope of the accompanying claims.

The invention claimed is:

1. A method for manufacturing rutile-structured titanium dioxide having excellent photocatalytic activity, comprising:
   (i) applying a voltage of 100 V or higher and performing anodic oxidation for a duration of 2 minutes or longer on a surface of titanium or a titanium alloy base material in an electrolyte of sulfuric acid concentration ranging from 2.6 wt % to 14.1 wt % to produce a film of rutile structured titanium dioxide on the surface of the titanium or titanium alloy base material;

and performing annealing in the atmosphere at a temperature ranging from 400° C. to 1000° C. or higher on said film produced or (ii) performing anodic oxidation for a duration 2 minutes or longer on the surface of a titanium or a titanium alloy base material, in an electrolyte of sulfuric acid concentration ranging from 2.6 wt % to 14.1 wt %, under conditions of current density of 25 mA/cm2 or higher to produce a film of rutile structured titanium dioxide on the surface of the titanium or titanium alloy base material;

and performing annealing in the atmosphere at a temperature ranging from 400° C. to 1000° C. or higher on said film produced.

2. The method according to claim 1, wherein the anodic oxidation is performed in an electrolyte of sulfuric acid concentration ranging from 8.8 to 14.1 wt %.

3. The method according to claim 1, wherein the conditions of current density are 30 mA/cm$^2$ or higher.

4. The method according to claim 1, wherein the anodic oxidation is performed at a voltage of 200 to 450 V or higher for a duration ranging from 20 minutes to 3 hours.

5. The method according to claim 1, wherein the anodic oxidation is performed at a voltage of 210 or 220 V for 30 minutes.

6. The method according to claim 1, wherein the anodic oxidation is performed in an electrolyte of sulfuric acid concentration of 10.5 wt % or 14.1 wt %.

7. The method according to claim 1, wherein the annealing is performed in the atmosphere at a temperature ranging from 400 to 1000° C. for a duration of 1 hour or longer.

8. The method according to claim 1, wherein the annealing is performed in the atmosphere at a temperature of 450° C. for 1 to 5 hours.

9. The method according to claim 1, wherein said rutile-structured titanium dioxide with high crystallinity and containing 90% or higher of rutile-structured titanium dioxide in which the half-value width of the rutile 110 diffraction line in an X-ray diffraction pattern less than 0.4 is produced having a photocatalytic activity in which the methylene blue degradation rate is 80% or higher under ultraviolet light at 365 nm, and visible-light response properties in which the methylene blue degradation rate is 30% or higher under visible light at 400 nm; and exhibits hydrophilicity in which the contact angle is 15 degrees or less in a contact angle measurement by the θ/2 method.

10. The method according to claim 1, wherein said rutile-structured titanium dioxide is doped with sulfur.

11. The method according to claim 1, wherein said rutile-structured titanium dioxide is doped with sulfur and contains sulfur ranging from 200 ppm (0.02%) to 4000 ppm (0.4%) of sulfur in the titanium dioxide.

12. A photocatalyst of a titanium dioxide formed by (i) applying a voltage of 100 V or higher and performing anodic oxidation for a period of 2 minutes or longer on a surface of titanium or a titanium alloy base material so as to produce a film on the surface of the titanium or titanium alloy base material, in an electrolyte of sulphuric acid concentration ranging from 2.6 wt % to 14.1 wt % the titanium dioxide photocatalyst being characterized in that said titanium dioxide contains 90% or higher of rutile-structured titanium dioxide in which the half-value width of the rutile 110 diffraction line in an X-ray diffraction pattern is less than 0.4; has photocatalytic activity in which the methylene blue degradation rate is 80% or higher under ultraviolet light at 365 nm, and has visible-light response properties in which the methylene blue degradation rate is 30% or higher under visible light at 400 nm; and exhibits hydrophilicity in which the contact angle is 15 degrees or less in a contact angle measurement by the theta/2 method or (ii) performing anodic oxidation for a duration of 2 minutes or longer in an electrolyte of sulfuric acid concentration ranging from 2.6 wt % to 14.1 wt %, under conditions of current density of 25 mA/cm2 or higher, on a surface of titanium or a titanium alloy base material so as to produce a film on the surface of the titanium or titanium alloy base material, and performing an annealing in the atmosphere at a temperature ranging from 400° C. to 1000° C. on said film produced;

the titanium dioxide photocatalyst being characterized in that said titanium dioxide contains 90% or higher of rutile-structured titanium dioxide in which the half-value width of the rutile 110 diffraction line in an X-ray diffraction pattern is less than 0.4; has photocatalytic activity in which the methylene blue degradation rate is 80% or higher under ultraviolet light at 365 nm, and has visible-light response properties in which the methylene blue degradation rate is 30% or higher under visible light at 400 nm; and exhibits hydrophilicity in which the contact angle is 15 degrees or less in a contact angle measurement by the theta/2 method.

13. The photocatalyst according to claim 12, wherein said rutile-structured titanium dioxide is an anodic oxidation thin film doped with sulfur.

14. The photocatalyst according to claim 12, wherein said rutile-structured titanium dioxide is doped with sulfur and contains sulfur ranging from 200 ppm (0.02%) to 4000 ppm (0.4%) in the titanium dioxide layer.

15. The photocatalyst according to claim 13, wherein said rutile-structured titanium dioxide is doped with sulfur and contains sulfur ranging from 200 ppm (0.02%) to 4000 ppm (0.4%) in the titanium dioxide layer.

* * * * *